Nov. 20, 1945. R. C. GRAHAM 2,389,255
CONNECTOR
Filed Oct. 22, 1941

INVENTOR
Robert C. Graham
BY George J. Schnettler
ATTORNEY

Patented Nov. 20, 1945

2,389,255

UNITED STATES PATENT OFFICE 2,389,255

CONNECTOR

Robert C. Graham, Rome, N. Y., assignor to General Cable Corporation, New York, N. Y., a corporation of New Jersey Application October 22, 1941, Serial No. 415,995

2 Claims. (Cl. 173—340)

This invention relates to connectors for insulated conductors and is particularly adapted to establish a mechanical and electrical connection between two insulated conductors each of which comprises a number of metallic strands surrounded by a sheath of insulation.

The principal object of the invention is to provide a connector which may be quickly applied under adverse conditions and without removing the insulation of the conductors to be connected in order to establish with certainty an electrical connection of low resistance and a mechanical connection of high tensile strength.

Figure 1:
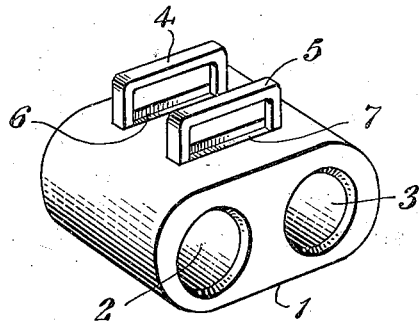
Figure 2:
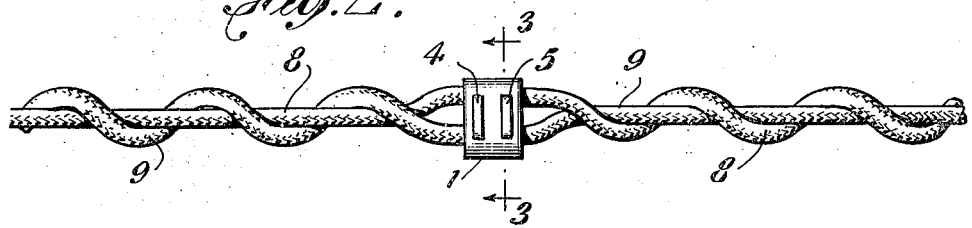
Figure 3:
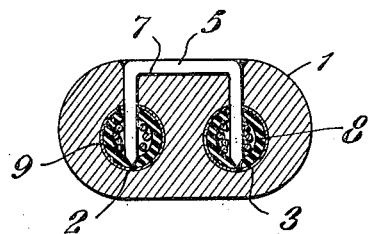

A preferred embodiment of the invention has been selected for illustration in the accompanying drawing wherein Figure 1 is a perspective view upon an enlarged scale of a connector embodying the invention;

Figure 2 is a top plan view of the connector upon a smaller scale than Figure 1, showing a preferred form of completed connection between two insulated conductors; and Figure 3 is a cross section of the conductor on the line 3—3 of Figure 2 but upon the enlarged scale of Figure 1.

The present invention has been developed to overcome problems arising in the connection of so-called field wire which is used for communication purposes by military forces. Such wire usually is of approximately 0.15 inch in overall diameter and consists of a number of metallic strands twisted or stranded together, or laid parallel to each other, and enclosed by a sheath consisting of insulating material, such as rubber or rubber compound, which in turn is surrounded by a fabric suitably coated or impregnated. Some of the wire strands, usually four in number, are steel of high tensile strength, and the remainder, usually three in number, are of copper. This type of wire is of relatively high tensile strength so that it may satisfactorily withstand the strains which are put upon it when it is unreeled for use and laid on the ground or strung upon fences, trees or other available supports and also while it is being moved from one location to another. When this wire is laid in the first instance, connections must be made between each length, and at other times broken lengths of wire must be connected. Obviously, the advantages of using high tensile strength wire are minimized or eliminated entirely if the connections do not develop a tensile strength approaching that of the wire itself. Accordingly, a splicing technique has been developed which includes stripping the insulation from the conductors of two ends of wire, knotting the bare conductors together, and reinsulating the joint thus formed. The splice thus obtained has a reasonably satisfactory tensile strength in the neighborhood of one-half the strength of the wire itself. The stripping of the insulation in order to make such a splice is usually done with a sharp knife. During this stripping operation the copper strands are sometimes severed and, if this severing of the copper strands is unnoticed and the joint completed with only the steel strands, an unsatisfactory weak splice is produced.

The present invention overcomes these difficulties and makes it possible to connect two ends of this type of insulated wire in a manner which develops in the splice approximately the full tensile strength of the wire itself. The operation of applying the connector is extremely simple and may, if necessary, be carried out entirely by the sense of touch so that connections may be made in the dark and under other adverse conditions.

Referring to Figure 1, it will be observed that the illustrative embodiment of the connector comprises a body portion 1 with two cylindrical apertures 2 and 3 conveniently arranged parallel to each other and preferably extending entirely through the body portion from end to end. This body portion may be formed by die casting or molding a suitable non-frangible, somewhat plastic material such as lead or lead alloy, or it may, if desired, consist of rubber or rubber compound vulcanized to such a degree that it will be firm and relatively unyielding but will retain the contact members hereinafter mentioned. Other non-frangible molded plastics may be used. The diameter of the apertures 2 and 3 is slightly greater than the overall diameter of the insulated wire with which the connector is to be used, so that the wire may be readily inserted and drawn through each aperture but will fit snugly therein.

Contact means are mounted in the connector and, as best shown in Figures 1 and 3, may conveniently take the form of metallic staples 4 and 5, preferably of copper covered steel, suitably pointed at their ends. These staples may be partially embedded in the material of the upper half of the body portion which may be grooved to provide recesses 6 and 7 for the cross bar of each staple when it is moved into connecting position as shown in Figures 2 and 3. The staples 4 and 5 are so positioned in the body portion that one leg of each staple is disposed at a right angle to the axis of one aperture and in a plane passing through said axis, while the other leg of each staple is similarly disposed in relation to the axis of the other aperture. The legs of both staples are frictionally but firmly held in the body portion of the connector so that the staples will remain in the position shown in Figure 1 until the connector is assembled with the insulated wires which are to be joined thereby. The legs of the staples 4 and 5 may be driven into the body portion or pressed into under-sized holes formed to receive them, depending upon the nature of the material used for the body portion. It will be noted that the thickness of the body portion above the apertures 2 and 3 is somewhat greater than it is below the apertures in order that there may be sufficient material to firmly engage the legs of the staples.

There are several different ways in which two ends of insulated wire may be brought together for splicing by means of the connector herein described, but in each case the end of one wire will be pushed into or through one aperture and the end of the other into or through the other aperture.

A preferred form of splice is shown in Figure 2 wherein the insulated wires to be joined are marked 8 and 9 respectively. In order to make this particular form of splice, the end of the wire 9 is pushed through aperture 2 until about six inches projects to the left. Wire 8 is similarly pushed through aperture 3 but in the reverse direction. Then with the aid of ordinary wire pliers or by a blow delivered with any suitable instrument the staples 4 and 5 are pressed or driven into the body portion 1. Thus the point of one leg or prong of each staple will pass through the insulation of the insulated wire 8, between the metallic conductors assembled therein, again through the insulation and, depending upon the length of the staple, may engage the lower wall of the aperture 3. At the same time the point of the other leg or prong of each staple will pass through the other insulated wire 9 in the same manner and to the same extent.

In the foregoing manner an electrical connection of low resistance is effected between the conductors of the insulated wires 8 and 9 as shown in Figure 3. Therein it will be seen that one leg of the staple 5 has been forced between the conductors of the insulated wire 9, while the other leg has been simultaneously forced between the conductors of insulated wire 8. Inasmuch as the apertures 2 and 3 resist any diametrical expansion of the insulated wires 8 and 9 a firm contact is established. The connection thus made is equally efficient regardless of whether the metallic conductors are twisted or laid parallel to each other within the surrounding insulation.

Electrical measurements show that the average direct current contact resistance of this type of connection between two lengths of field wire of the type hereinabove described is 0.02 ohm, which is less than the direct current resistance of one foot of the wire itself. The provision of two contact members such as staples 4 and 5, instead of one, minimizes the chances of failure to effect an electrical union if the connection is hurriedly and improperly applied.

Although the connector applied as just described effects a strong mechanical as well as an efficient electrical connection, it also affords an opportunity for further mechanical connection which develops the full tensile strength of the insulated wire. With this type of connector it is possible to engage two lengths of insulated wires directly with each other in a number of ways. Referring again to Figure 3, it will be observed that the end of the wire 8 where it emerges from the connector at the right is wound around the insulated wire 9 for several turns, which in practice will preferably be four complete turns. The end of the insulated wire 9 where it emerges from the connector at the left is similarly wound around the insulated wire 8. Thus each insulated wire engages the other independently of but in addition to the engagement afforded by the connector.

Heretofore reference has been made only to the splicing of two lengths of insulated wire to join them in a single circuit. Usually the type of insulated wire herein referred to is furnished and used in the form of a twisted pair. In order to effect a connection between each wire of one pair and one wire of the other pair it will be understood that two connectors are used, and that the procedure above described is followed with respect to one wire of each twisted pair in order to complete two separate circuits.

The insulation of connections effected as above described may readily be secured by taping the exposed outer end of each wire where it lies upon the other and by taping over the connector itself.

Completed connections of twisted pairs effected in the above described manner have been tested repeatedly for mechanical strength and it has been found that the tensile strength of the splice is approximately the same or even greater than that of the wire itself. The results of these tests are markedly different from the results of similar tests of connections made by stripping and knotting the conducting wires, the latter type of connection developing only approximately one-half of the tensile strength of the wire itself.

In the case of field wire of the type hereinabove described with parallel strands, several tests show that a twisted pair has an average tensile strength of 363 pounds. The average tensile strength of splices made in a twisted pair by carefully stripping and knotting the metallic conductors was 158 pounds, while the average tensile strength of splices made in a twisted pair by the invention hereinabove described was 360 pounds and the break was outside of the splice.

In the case of this same type of wire with twisted or concentric lay strands, the corresponding figures for a twisted pair of such wires were 354 pounds, and for the knotted splice 175 pounds, while the average tensile strength of the splices made in a twisted pair by the invention herein described was 350 pounds and the break was outside of the splice.

The connector herein described is adapted for use in making other types of connections. For example, the insulated twisted pair of wires may be knotted, or twisted and knotted together and then the end of each wire of one pair may be connected with the end of one wire of the other pair by applying to each pair of ends the connector herein shown and described.

The preferred form of the invention herein shown and described may be variously modified and embodied within the scope of the subjoined claims.

I claim as my invention:

1. A connector for joining and holding together the ends of two insulated electrical conductors each having a plurality of wires assembled within and covered by a sheath of insulating material which consists, in combination, of a unitary body portion apertured to provide two cylindrical chambers extending therethrough, each of which is adapted to hold therein firmly against lateral movement one insulated conductor, and a U-shaped metallic contact member mounted in said body portion with one leg disposed along a line intersecting the axis of one chamber and the other leg disposed along a line intersecting the axis of the other chamber, each of said legs being positioned and adapted to penetrate the walls of the body and the insulation of a conductor so as to contact the wires thereof and form a strong mechanical and low resistance electrical connection between insulated conductors disposed within said chambers respectively, the legs of the U-shaped member being shorter than the overall dimension of the body portion in the direction of said legs.

2. A connector for joining and holding together the ends of two insulated electrical conductors each having a plurality of wires assembled within and covered by a sheath of insulating material which consists, in combination, of a unitary body portion apertured to provide two cylindrical chambers extending thoough the body portion parallel to each other, each of an internal diameter adapted to receive and hold therein firmly against lateral movement an insulated electrical conductor, and two U-shaped metallic contact members mounted in said body portion, each having one leg disposed along a line intersecting the axis of one chamber and the other leg disposed along a line intersecting the axis of the other chamber, each leg being positioned and adapted to penetrate the walls of the body and the insulation of a conductor lying in the chamber whose axis said leg intersects to contact the wires of said conductor and form a strong mechanical and low resistance electrical connection by each U-shaped member between insulated conductors disposed within said chambers respectively.

ROBERT C. GRAHAM.